Jan. 17, 1961 J. K. ROYLE ET AL 2,968,144

SERVO CONTROLLED DRIVE MECHANISM

Filed March 17, 1959 5 Sheets-Sheet 1

INVENTORS
JOSEPH KENNETH ROYLE
ANTHONY WILLIAMS

BY Lawrey and Taylor

Jan. 17, 1961 J. K. ROYLE ET AL 2,968,144

SERVO CONTROLLED DRIVE MECHANISM

Filed March 17, 1959 5 Sheets-Sheet 2

INVENTORS

JOSEPH KENNETH ROYLE

ANTHONY WILLIAMS

BY Lawson and Taylor

Jan. 17, 1961 J. K. ROYLE ET AL 2,968,144

SERVO CONTROLLED DRIVE MECHANISM

Filed March 17, 1959 5 Sheets-Sheet 3

INVENTORS
JOSEPH KENNETH ROYLE
ANTHONY WILLIAMS
BY Lawson and Taylor

SERVO CONTROLLED DRIVE MECHANISM

Filed March 17, 1959 5 Sheets-Sheet 4

INVENTORS
JOSEPH KENNETH ROYLE
ANTHONY WILLIAMS
BY Larson and Taylor 2,968,144
Patented Jan. 17, 1961

2,968,144

SERVO CONTROLLED DRIVE MECHANISM

Joseph Kenneth Royle and Anthony Williams, Stockport, England, assignors to National Research Development Corporation, London, England, a British corporation Filed Mar. 17, 1959, Ser. No. 799,943

Claims priority, application Great Britain Mar. 26, 1958

7 Claims. (Cl. 60—6)

This invention relates to apparatus for driving a first object along a predetermined path in relation to a second object and is particularly applicable to the propulsion of the slides of machine tools along their slideways though the invention is not confined to such applications.

According to the invention there is provided apparatus for driving a first object along a predetermined path in relation to a second object comprising two driving mechanisms coupled together and to the first object and the second object in such a manner that movements of the first object relative to the second object along the said path are dependent upon the alegbraic sum of the individual driving actions of the two driving mechanism, the first driving mechanism being capable of a relatively high driving acceleration over only a relatively short range of driving action and the second driving mechanism being capable of a relatively long range of driving action but being arranged to provide only a relatively low driving acceleration, means, responsive to a first signal representing the motion required of the first object in relation to the second object along the said path, for actuating the first driving mechanism, means for producing a second signal, means for applying the second signal to control the driving action of the second driving mechanism, the second signal representing the average velocity, over a continuously advancing time period of predetermined duration, of the motion required of the first object relative to the second object along the said predetermined path, and being related to the first signal in such a manner as to prevent the first driving mechanism from reaching the end of its range of driving action.

According to the invention there is further provided apparatus for driving a first object along a predetermined path in relation to a second object comprising two driving mechanisms coupled together and to the first object and the second object in such a manner that movements of the first object relative to the second object along the said path are dependent upon the algebraic sum of the individual driving actions of the two driving mechanisms, the first driving mechanism being capable of a relatively high driving acceleration over only a relatively short range of driving action and the second driving mechanism being capable of a relatively long range of driving action but being arranged to provide only a relatively low driving acceleration, means for receiving signals representing required relative movements between the two objects along the said path, means under control of the receiving means, for actuating the first driving mechanism in direct accordance with the said signals and means under control of the receiving means for driving the second driving mechanism at a velocity, which at any instant, is the algebraic mean, over a predetermined period of time including that instant, of the velocities required of the said objects relative to one another, as represented by the said signals.

According to the invention there is further provided apparatus for driving a first object in relation to a second object along a predetermined path, having a first driving mechanism and a second driving mechanism, these two driving mechanisms being coupled together and to the first object and the second object in such a manner that movements of the first object relative to the second object along the said path are dependent upon the algebraic sum of the individual driving actions of the two driving mechanisms, the first driving mechanism being capable of a relatively high driving acceleration over only a relatively short range of driving action and the second driving mechanism being capable of a relatively long range of driving action but being arranged to provide only a relatively low driving acceleration, a closed servo loop for controlling the relative motion between the two objects in the direction of the said path, such loop comprising means for receiving command signals characteristic of desired relative motion between the said objects along the said path means for receiving monitor signals characteristic of relative motions actually taking place between the said objects along the said path, means for continuously comparing the command signals and the monitor signals and continuously generating an error signal representing the instantaneous difference between the command signals and the monitor signals, means for continuously actuating the first driving mechanism in accordance with the instantaneous value of the error signal and means for actuating the second driving mechanism so that it executes a driving action tending to produce, between the said objects, relative movements at the average, over a continuously advancing period of time of predetermined length, of the velocity of the said desired relative motion between the said objects.

According to the invention there is further provided apparatus for driving a first object in relation to a second object along a predetermined path, having a first driving mechanism comprising a hydraulic piston and cylinder arrangement and a second driving mechanism comprising a rotary driving motor coupled to a device for transforming rotary motion derived from the said motor, into motion in the direction of the said path, the two driving mechanisms being coupled together and to the first object and the second object so that relative movement between the two objects along the said path is dependent upon the algebraic sum of the driving actions of the two driving mechanisms, the hydraulic piston and cylinder arrangement having a short stroke and being controlled by a high performance hydraulic valve, the second driving mechanism having a range of driving action which is long in relation to the said stroke but being arranged to provide a driving acceleration which is low in relation to that of the hydraulic piston and cylinder arrangement, a closed servo loop for controlling the relative motion between the two objects in the direction of the said path comprising means for receiving signals characteristic of desired relative motion between the said objects along the said path, means for receiving monitor signals characteristic of relative motions actually taking place between the said objects along the said path, means for comparing the said signals so received and continuously generating an error signal representing the difference between the said signals, an actuator for the hydraulic valve, means for continuously operating the actuator in accordance with the instantaneous value of the error signal, second means for receiving the command signals, means under control of the second command signal receiving means for deriving a velocity signal representing an average of the relative velocity between the said objects represented by the command signals, first means for energising the motor of the second driving mechanism under control of the velocity signals, co-operating members coupled respectively to the piston and cylinder of the said hydraulic arrangement engaging when the piston reaches a predetermined position between the middle and an end of its stroke, second motor energising means operative when the said members engage as aforesaid, for releasing the motor of the second driving mechanism from control by the velocity signal and for energising the said motor in a sense such as to supplement the driving action of the hydraulic arrangement and operative after the members have moved out of engagement for de-energising the motor and restoring it to control by the velocity signals.

The invention will be more readily understood from the following description of certain embodiments thereof illustrated in the accompanying drawings in which.

Figure 1:
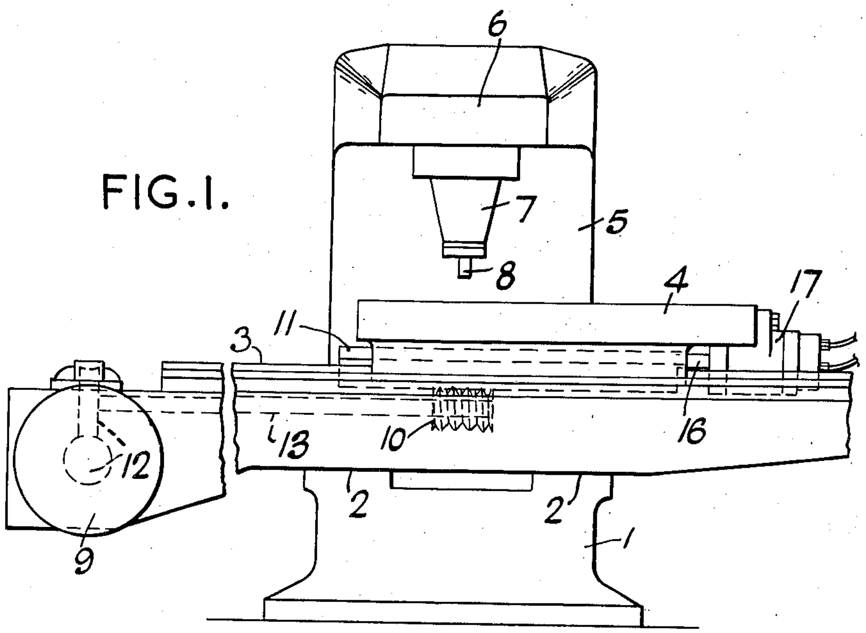
Fig. 1 is an elevation of an embodiment of the invention.

For convenience of description the first driving mechanism will hereinafter be referred to as "the quick drive" and the second driving mechanism will be hereinafter referred to as "the slow drive" but these terms should not be considered as in any way defining or limiting the properties of the two said mechanisms.

The invention finds its principal uses in systems where the relative positions, velocity or acceleration (or any combination of the three) of or between two objects, along a predetermined path, is required to be under control of a command signal of which a characteristic is variable according to the relative position, velocity or acceleration (or combination of the three) required of the two objects.

Systems of this type, commonly called "servo systems," present the difficulty that a driving mechanism having a quick response to a change of the command signal will tend to have a small range of driving action and conversely a driving mechanism having a large range of driving action will tend to have a slow response to a change of the command signal.

This may be illustrated by the following examples:

A hydraulic piston and cylinder under the control of a well designed valve can respond extremely quickly to a sudden change in a command signal applied to an actuator controlling the valve but if the cylinder is long this advantage is lost due to the compliance or compression of the hydraulic fluid contained in the cylinder. The compressibility of this volume of fluid reduces the stiffness of the system so that the resonant frequency of the inertia load is lowered.

The stiffness of a long hydraulic cylinder can be increased by increasing the diameter of the bore but this in turn increases the volume of the fluid to be moved which requires a large valve with a slower response.

The quick response of a hydraulic piston and cylinder arrangement is therefore only obtainable when the stroke is short.

To provide a relatively large movement between the two objects various mechanisms, many of which involve rotating elements, are available. An example of the latter is the well known lead screw and nut, one element being rotated by a rotary motor. Another example is a rack and worm. These mechanisms can be designed to provide great stiffness combined with a long stroke but it is correspondingly difficult to procure quick response without complication and expense. For instance, if the rotating element is driven by an electric motor, the armature may not be rapidly accelerated without the application of considerable power. This difficulty becomes more acute the heavier the loads encountered.

A long hydraulic piston and cylinder combination is another instance of a driving mechanism suitable for providing relatively large movement between the two objects but it has already been explained that such a drive lacks stiffness unless it has a large diameter.

The invention combines the virtues of both types of driving mechanism and avoids their limitations.

Various kinematically equivalent arrangements of a quick drive and a slow drive may be used for providing relative motion between a first object and a second object. Suppose for instance the first object is represented by a machine tool work table riding on slideways anchored to the fixed parts of the machine tool, and the second object is represented by the said fixed parts. Suppose further that the quick drive takes the form of a short stroke hydraulic ram, controlled by a valve operated by an actuator responsive to command signals and the slow drive is represented as a bar working in combination with a rotary-to-linear converter (such as a lead screw and nut respectively or a rack and worm respectively) driven by a motor.

In one arrangement the quick drive may be carried by the work table and have a movable member attached to the bar (which might in this case be a rack), the latter co-operating with a rotary-to-linear converter (which might be a worm journalled in bearings), anchored to the slideways and rotated by a motor similarly anchored.

In another arrangement the quick drive may again be carried by the work table with its moveable member attached to the bar. The bar (which might in this case be a lead screw) rotates so that the moveable member of the quick drive must also rotate unless a rotary joint is interposed between them. If the moveable member is the piston of a hydraulic piston and cylinder arrangement, the piston can be given sufficient clearance to enable it to rotate in the cylinder without undue friction. The bar cooperates with a non-rotating or passive rotary-to-linear converter (which might be a nut), anchored to the slideways and the bar is rotated by a motor M carried by the work table via a splined joint which permits endwise movement of the bar to the extent of the stroke of the quick drive.

In a further arrangement the quick drive is floating, with its moveable member coupled to the work table. A non-rotating or passive rotary-to-linear converter (which in this case might be a nut), is anchored to the quick drive and co-operates with a bar (which might be a lead screw), rotated by a motor anchored to the slideways. In practice the quick drive would ride on slideways parallel to the slideways for the work table.

In yet a further arrangement, the quick drive is anchored to the slideways and its moveable member is coupled to a non-rotating or passive rotary-to-linear converter (which in this case might be a nut), co-operating with a bar which might be a lead screw rotated by a motor anchored to the work table. This arrangement has the advantage, where a hydraulic device is used for the quick drive, that it can be supplied by rigid piping.

In yet a further arrangement both the quick drive and the motor of the slow drive are anchored to the slideways and the quick drive moveable member is coupled to the bar of the slow drive (which in this case might be a lead screw), either directly or through a rotary coupling and the bar co-operates with a non-rotating or passive rotary-to-linear converter (which might be a nut), anchored to the work table. Where there is no rotary coupling between the bar and the moveable member of the quick drive the latter must rotate. The motor drives the bar through gearing and a splined joint which permits endwise movement of the bar to the extent of the stroke of the quick drive. With this arrangement all power supplies are coupled without the need for flexible leads.

In yet another arrangement the quick drive is anchored to the slideways, the motor of the slow drive and a rotating or active rotary-to-linear converter (which in this case might be a worm journalled in bearings), are connected to the moveable member of the quick drive and this assembly would in practice be mounted on additional slideways parallel to the main slideways supporting the work table and providing free movement along the additional slideways to the extent of the stroke of the quick drive. The rotary-to-linear converter co-operates with a non-rotating or passive bar (which might be a rack), anchored to the work table.

In yet another arrangement the quick drive, the motor of the slow drive and a sliding coupling for rotating the bar of the slow drive (which in this case might be a lead screw), are all anchored to the work table. The bar of the slow drive is coupled to the moveable member of the quick drive so that the latter must rotate unless a rotary coupling is introduced between them. The bar of the slow drive co-operates with a non-rotating or passive rotary-to-linear converter (which might in this case be a nut), anchored to the slideways.

The above examples illustrate variants of the invention in the form where the quick drive is capable of relative linear movements between its driving members over a limited length of stroke and where the slow drive incorporates a rotary motor and a rotary-to-linear converter. These examples are given to indicate what is meant by the expression "kinematically equivalent arrangements" but they must not be regarded as limiting the invention which indeed is not confined to the case where the relative motion required between the two objects is a linear or straight line motion; for instance the said relative motion may be rotary motion as will be explained below with reference to Fig. 11.

A practical embodiment of the invention will now be described in relation to Figs. 1 to 11 of the accompanying drawings.

Fig. 1 is an elevation of a milling machine incorporating the invention.

The machine has a main casting 1 providing a horizontal platform 2 supporting slideways 3 upon which a work table 4 may ride from right to left and vice versa, as shown in the figure. Behind the slideways 3, a vertical pillar 5 fixed to main casting 1 supports a beam 6 overhanging the work table 4 and beam 6 has on its underside slideways not visible in the drawings, upon which rides a vertical tool spindle mounting 7 which is capable of horizontal movement on the slideways of the beam 6 in a direction normal to the plane of the paper. The slideways 3 and the slideways on the beam 6 permit relative movement between a tool carried on the spindle 8 and a work piece fixed to work table 4, along two axes at right angles to one another.

The work table 4 is moved along slideways 3 by means of a motor 9 driving a worm 10 (shown in dotted lines in Fig. 1) which co-operates with a rack 11 (shown mainly in dotted lines in Fig. 1). Motor 9 is coupled to worm 10 via a worm and worm wheel gear train 12 and shaft 13 (shown in dotted lines in Fig. 1). Shaft 13 is coupled to worm 10 by gearing 14 not shown in Fig. 1 but visible in Fig. 2.

Rack 11 rides in guides 15 in the underside of work table 4 (visible in Fig. 3) and is coupled to the work table via the piston rod 16 of a hydraulic piston and cylinder arrangement 17 the cylinder of which is bolted to work table 4.

Figure 2:
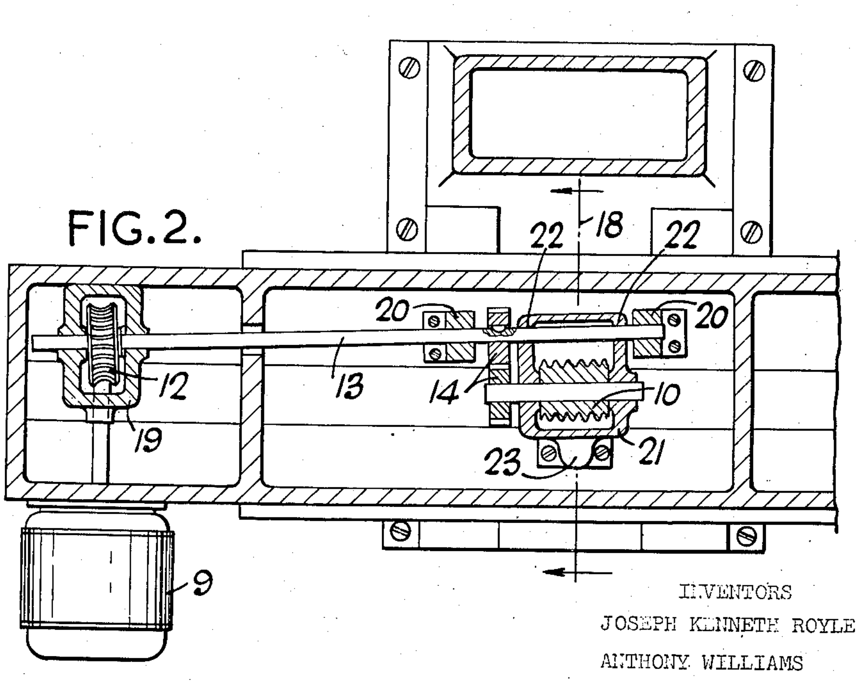
Fig. 2 is a sectioned plan of the said embodiment.
Figure 3:
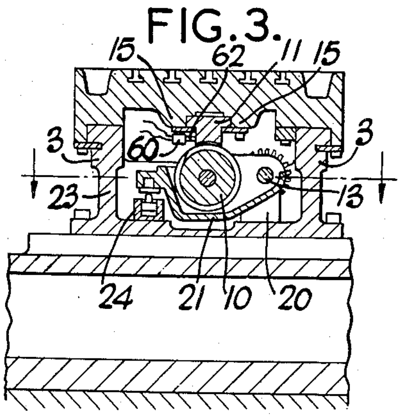
Fig. 3 is a cross sectional side elevation of the said embodiment.
Figure 5:
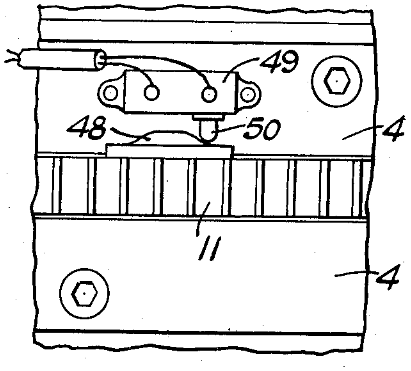
Fig. 5 is a detailed underside view to an enlarged scale of a part of the said embodiment.

Fig. 2 shows the milling machine in plan, sectioned in a horizontal plane running through the centre of worm 10. Fig. 3 is a vertical section of the milling machine along line 18, looking in the direction of the arrows.

Shaft 13 is supported at one end by bearings in a housing 19, fixed rigidly to platform 2, which accommodates the gear train 12. At its other end shaft 13 is supported in bearings 20 secured to the floor of the structure of slideways 3. Worm 10 is journalled for rotation in a cradle 21 and this cradle is capable of rotation bodily about the axis of shaft 13 which passes through bearing bushes 22 in cradle 21 which provide a pivot for the latter. Special precautions are taken to prevent endwise movement of shaft 13, worm 10 and cradle 21. These precautions, which are omitted to simplify the drawing, may take the form of conventional thrust bearings or may include a thrust bearing loaded by a hydraulic thrust arrangement. Cradle 21 has a lug 23 on the side remote from shaft 13 which rests on a hydraulic jack unit 24. Jack unit 24 is supplied with hydraulic fluid at a suitable pressure and forces the lug 23 upwards so that cradle 21 is urged to rotate about shaft 13 clockwise in relation to Fig. 3 whereby worm 10 is forced upwards into engagement with rack 11 for the elimination of backlash.

Figure 4:
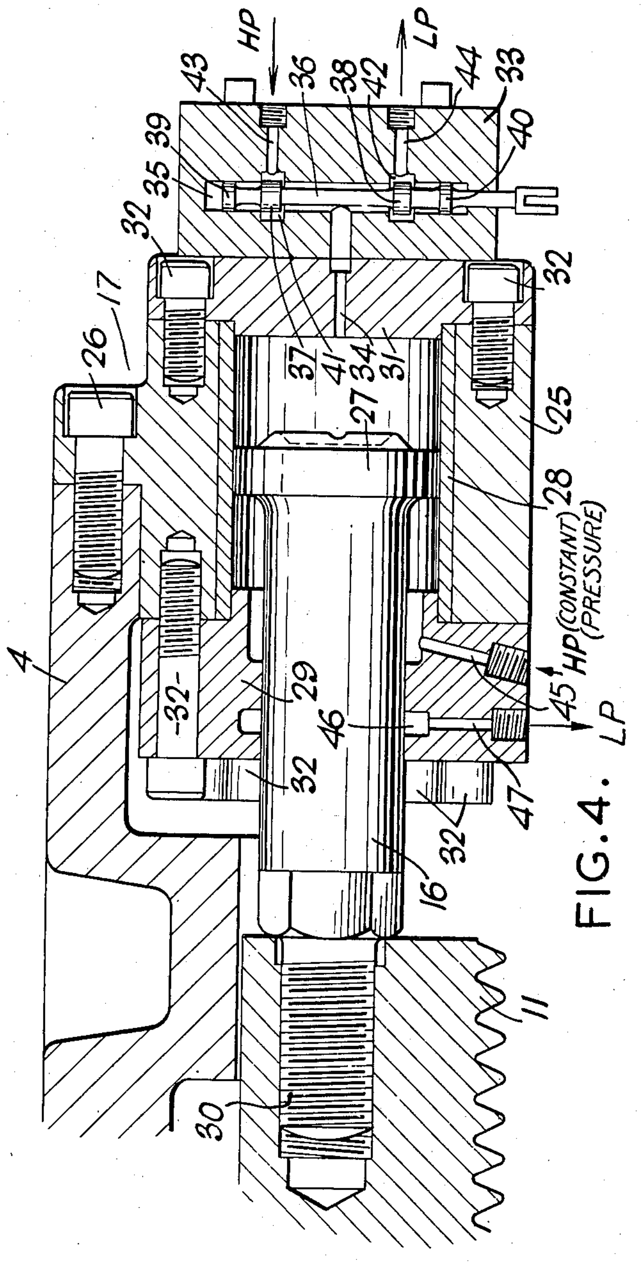
Fig. 4 is a cross section to an enlarged scale of a part of the said embodiment.

Fig. 4 shows the hydraulic piston and cylinder combination 17 is section to an enlarged scale.

A cylinder body 25 is secured to the end of work table 4 by means of bolts such as bolt 26. A piston 27 slides in the bore liner 28 and is coupled to rack 11 by piston rod 16, which passes through a glanded cylinder end 29, by means of the screw-threaded extension 30. The other end of the cylinder is closed by a cylinder end 31, both cylinder ends being secured to the cylinder body 25 by means of bolts such as 32. The side of the cylinder to the right of piston 27, as seen in Fig. 4, communicates with a hydraulic valve 33 via a port 34 in cylinder end 31.

Valve 33 has a bore 35 in which rides a spool 36 having two controlling lands 37 and 38 and two sealing lands 39 and 40. The lands 37 and 38 co-operate with annular ports 41 and 42 grooved out of the surface of bore 35 and communicating via supply ports 43 and 44 with unions (not shown) for the attachment of pipes leading to the high pressure and low pressure sides respectively of a hydraulic pressure supply system. The controlling lands 37 and 38 are dimensioned so that, when the spool is in the central position they do not completely isolate ports 41 and 42 from one another whereby there is a small flow of hydraulic fluid between supply ports 43 and 44. This arrangement is commonly referred to as "underlap" and makes for stable operation of the valve at small openings.

The side of the cylinder to the left of piston 27, as seen in Fig. 4, communicates via a port 45 in cylinder end 29, with a union (not shown) for attachment of a pipe leading to the high pressure side of the hydraulic pressure supply system. The full pressure of the said system is therefore constantly applied to the left hand face of piston 27 but over an effective area which is reduced by the cross sectional area of piston rod 16. The pressure on the other side of piston 27 operates upon its full area however and is thus able to overcome the pressure on the left of piston 27 and force the latter to the left when the valve 33 is operated in the appropriate sense (i.e. upwards as seen in Fig. 4). Conversely, when the valve 33 is operated in the opposite sense the right hand side of piston 27 is acted upon by the low pressure of the hydraulic system, which is overcome by the high pressure to the left of the piston even though it works upon a smaller effective area of piston surface.

A groove 46 surrounds the outer end of piston rod 16 and is in communication via port 47 with a union (not shown) for attachment to the low pressure side of the hydraulic supply system, whereby oil leaking along the piston rod is scavenged.

Spool 26 is operated axially by an actuator which, for the sake of simplicity, is omitted from the drawing. This actuator is of a type responsive to command signals characteristic of movements required to be made by work table 4 along slideways 3.

In operation, the command signals produce movements of piston 27 which cause corresponding movements of work table 4, along slideways 3, in relation to rack 11, which, when motor 9 is at rest, is locked against axial movement by worm 10, the slant angle of which is such as to make the rack and worm combination virtually irreversible in the sense that loads applied to the rack 11 cannot rotate the worm 10.

Figure 6:
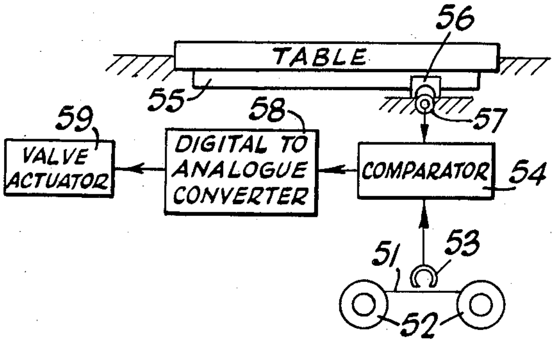
Fig. 6 is a schematic diagram of a servo control system for use with the invention.

It is the general practice in systems of this type for the signals applied to the actuator for valve 33 to be subject to a feed-back servo system. An example of such a system is schematically illustrated in Fig. 6. Fig. 6 shows a record tape 51, for instance a magnetic record tape, carrying signals characteristic of the motions required to be executed by work table 4. Tape 51 is carried on spools 52 and passed by conventional magnetic record play-back methods over a reading head 53. The reproduced command signals pass to a comparator 54 which has another input from apparatus which originates signals characteristic of motions made good from time to time by work table 4 along slideways 3. Fig. 6 illustrates one arrangement of this type in which an elongated optical diffraction grating 55 is attached to and moves with the work table and a smaller grating 56 is anchored to the slideways, the two gratings being so placed and aligned that the small grating is narrowly separated from and overlies some part of the large grating in all positons of the work table along its slideways. The directions of the rulings of the two gratings are relatively inclined at a small angle so that alternate dark and light bands (so-called "moiré fringes") are seen when looking through the two superimposed gratings at a light source. These bands are approximately normal to the direction of the lines of the two gratings and move in the direction of their breadth when the small grating moves along the large grating on movement of the work table along its slideways. When an optical slit, parallel to the longitudinal axes of the bands, is introduced into the light path, a photo electric cell such as that indicated at 57 in Fig. 6, trained on the light emerging from the gratings and the slit, has an output (ideally sinusoidal in waveform) which fluctuates according to the movement of the bands.

The pitch of the rulings on the diffraction gratings 55 and 56 may be of the same order of magnitude as the limits of accuracy to which the machine is to be controlled. A movement of the work table equal to the distance between two adjacent rulings produces a movement of the bands (or moiré fringes) such that one band occupies the place previously held by its immediate neighbour. As the bands and their spacing is many times greater than those of the grating lines the device provides a sensitive measure of work table movements, and the output of the light cell passes through one minimum and one maximum for each said movement of the work table.

Various proposals have been made for distinguishing between different directions of movement of the work table, which results in different directions of movement of the bands or moiré fringes, but it is not considered necessary to describe such methods. It is sufficient to say that light cell 57 gives an output which fluctuates in time with small increments of movement of the work table of predetermined length and that the direction of movement can be distinguished. If the command signals from pick-up 53 are in the form of signal elements each representing one of the said small increments of movement of the work table and having one form for one direction of movement and another form for the opposite direction of movement, the two inputs into comparator 54 can be compared and any difference can be arranged to represent the discrepancy at any instant between the movements required of the work table and the movement actually made good. This difference or error signal, derived from fluctuating indications, will be in incremental or digital form. To apply such an error signal to valve 33 a digital-to-analogue converter 58 is interposed between the comparator 54 and the valve actuator 59. The analogue signal applied to actuator 59 may be a voltage corresponding to the number of units of error held in comparator 54 at any instant.

Such a voltage applied to valve actuator 59 will operate valve 33 to cause relative movement between piston 27 and cylinder 17 and as the piston is held by the rack, the cylinder will move and with it the table. If the command signals from pick-up 53 call for continuous movement of work table 4 there will be a continuous error signal in 54 since, as soon as a cancelling signal is received from light cell 57 to cancel one command signal, the error is registered again on receipt of a new command signal. It is required that the slow drive shall move at a smoothly controlled rate sufficient to propel the work table at the average speed required of it, whilst leaving to the quick drive the task of providing any sudden acclerations required above or below that average speed.

Figure 7:
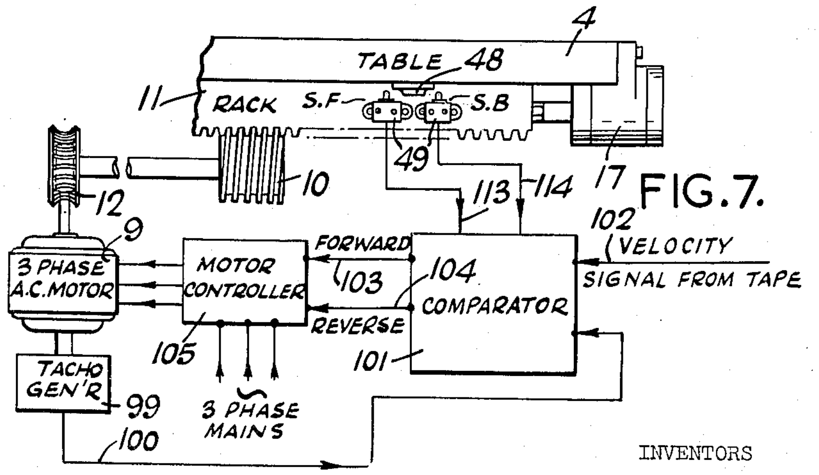
Fig. 7 is a schematic diagram of a motor control circuit forming part of the said embodiment.

The slow drive is therefore supplied independently with a command signal which may be derived from a source of the main command signals as shown in Fig. 6, namely the tape record 51, either by means of a separate track and a separate reading head or by means of circuitry connected to the reading head 53. This signal will represent the average velocity required of the work table during the course of a machining operation and though it will fluctuate to some extent it will not fluctate as suddenly as the main command signal applied to the quick drive. Fig. 7 shows an arrangement of this type in schematic form as applied to a construction of the type shown in Figs. 1, 2, 3 and 4.

Figure 8:
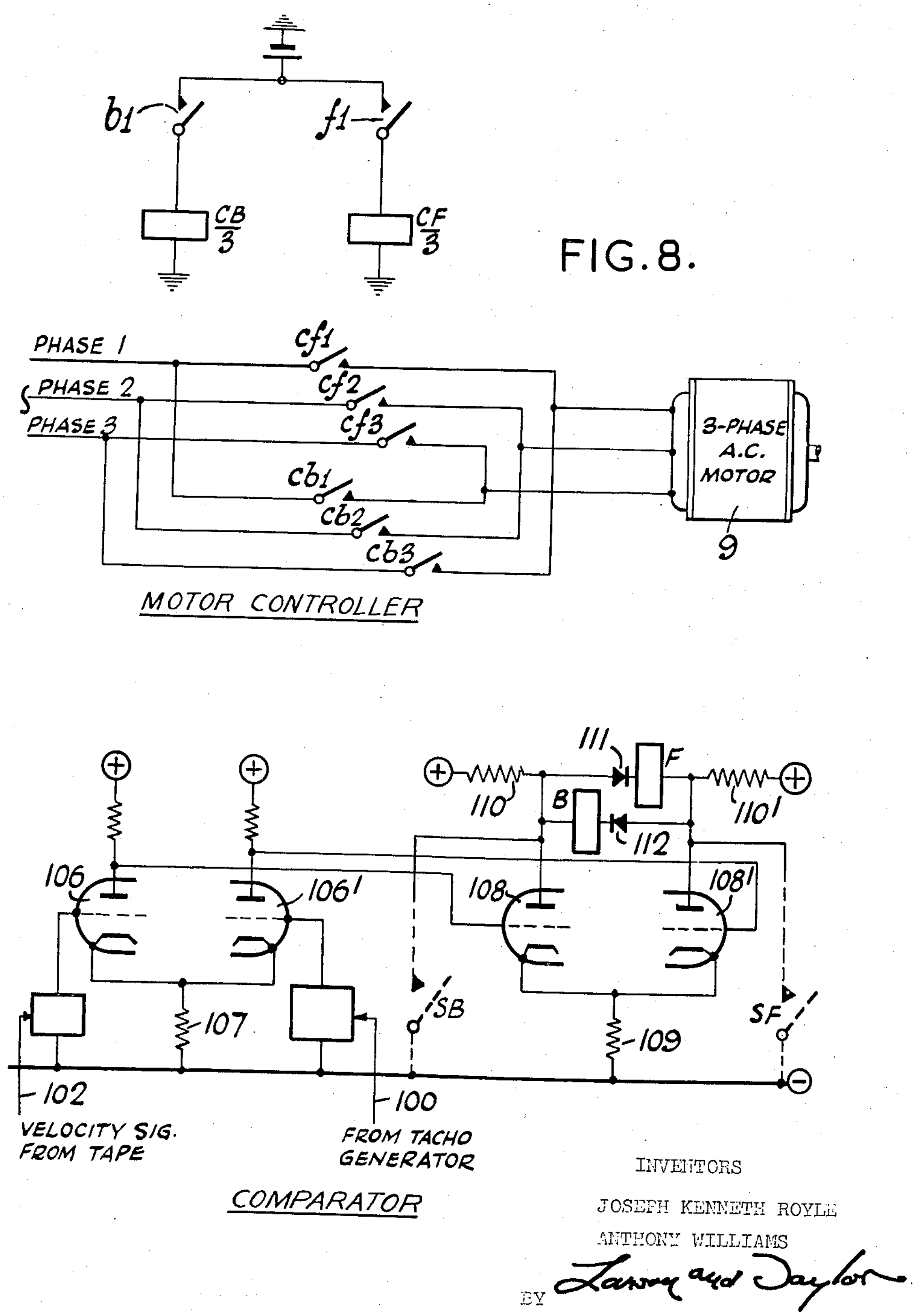
Fig. 8 is a circuit diagram of a motor control circuit for use with the said embodiment.

Although the average velocity signal (hereinafter referred to as the "velocity signal") may accurately represent the average speed required o fthe work table, it is nevertheless desirable that a feedback loop should be provided to check that the slow drive is in fact accurately following the velocity signal. For this purpose a tachometer generator 99 is coupled to the shaft of motor 9 and provides a signal on lead 100 proportional to the rotational speed of motor 9. A comparator 101 receives the velocity signal on lead 102 and the tachometer generator signal on lead 100 and provides an output corresponding to the difference, with due regard to sign, between the two input signals. In a simple arrangement the output from comparator 101 consists of closing one set of contacts for an error of one sign and another set of contacts for an error of the other sign when those errors exceed a certain predetermined threshold value. This is indicated schematically in Fig. 7 by the connections 103 ("forward") and 104 ("reverse"), these connections leading to a motor controller of the type shown in detail in Fig. 8. The circuit shown in the lower part of Fig. 8 represents one form of the comparator 101. The signals from leads 102 and 100 are applied respectively to the two grids of a double triode tube 106, 106′. The cathodes of this tube are connected together via a common cathode resistor 107 to the negative terminal of a source of high tension current supply, in the manner of a "long tailed pair." The two anodes are connected via individual anode resistors to the positive terminal of the high tension current supply.

In the absence of signals on leads 102 and 100 the two halves of tube 106, 106′ will pass substantially the same current. In the event of the signal on lead 102 exceeding that on lead 100 the tube-half 106 will conduct more than the tube-half 106′ and vice versa when the signal on lead 100 exceeds that on lead 102. The anodes of tube-half 106, 106′ are connected respectively to the grids of another double triode tube 108, 108′ the cathodes of which are connected together and via a common cathode resistor 109 to the negative terminal of the high tension current supply, again in the manner of a long tailed pair. The two anodes are connected via individual anode resistors 110, 110' to the positive terminal of the high tension current supply. The two anodes of tubes 108, 108' are connected together through a relay F in series with a rectifier 111 poled in one direction and also through a relay B in series with a rectifier 112 poled in the other direction. Relative variations in the magnitude in the signals received from leads 100 and 102 are amplified in the tubes 106, 106' and 108, 108' and when the anode of tube-half 108 is positive in relation to the anode of tube-half 108' in excess of a predetermined threshold difference potential, relay F will be operated but current cannot flow through relay B owing to the presence of rectifier 112. Conversely, when the anode of tube-half 108' is positive in relation to the anode of tube-half 108 by an amount exceeding the said predetermined difference potential, relay B will operate but relay F will be prevented from operation by reason of rectifier 111.

Relays F and B each have a normally open contact *f*1 or *b*1. Contacts *b*1 are connected in series between a battery supply and a relay CB and the contacts *f*1 are connected in series between the battery supply and a relay CF. These relays may be heavy duty contactors of the type used in conventional motor starter units. Motor 9 is shown as a three phase alternating current motor. Such a motor may be reversed by transposing the first and third phase connections from the supply mains to the motor. The three phase wires from the supply mains are connected to the motor, first via three normally open contacts *cf*1, *cf*2, and *cf*3 of relay CF and secondly via normally open contacts *cb*1, *cb*2 and *cb*3 of relay CB. As the relays CB. As the relays B and F cannot be simultaneously operated only one of the relays CB and CF at a time can be operated. When CF is operated the phase 1, phase 2 and phase 3 phase wires from the supply mains are connected to the upper, middle and lower terminals of the motor respectively. With CB operated the phase 1, phase 2 and phase 3 wires are connected to the lower, middle and upper terminals of the motor respectively. When the signals on leads 100 and 102 are equal or do not differ from one another beyond the predeterimned amount relays F and B both remain unoperated and the motor 9 is disconnected.

It is desirable in this arrangement, as a precautionary measure, to provide an overriding control to operate the motor when the quick drive is approaching the end of its stroke as an insurance against failure to implement the main command singal in the event of the velocity signal lagging behind the command signal applied to the quick drive due to some misfunctioning of the apparatus or some error in the computation of the velocity signal. This may be provided for by means of cam and switch arrangements such as 48 and 49 shown in Fig. 5 and shown again in Fig. 7, where a single cam 48 co-operates with one or other of two switches 49 designated respectively SF and SB. Connections from these switches are taken via leads 113 and 114 respectively to comparator 101. In Fig. 8 contacts SF and SB of these two switches are shown in dotted lines as being connected between the anodes of tube-halves 108' and 108 respectively and the negative terminal of the source of high tension current supply. Contacts SF and SB operate to override control by the velocity signals. When contacts SF are closed the anode of tube-half 108' is earthed while the anode of tube-half 108 is at a relatively high positive potential. This causes the operation of relay F. Conversely, when contacts SB are closed the anode of tube-half 108 is earthed while the anode of tube-half 108' remains at a relatively high positive potential and this results in the operation of relay B. The relative locations of cam 48 and the two switches SF and SB in Fig. 7 are such that the piston of quick drive 17 approaches fairly closely to the end of its stroke before the operation of the switches. When the switches operate the motor 9 is energized in a sense such that the slow drive supplements the driving action of the quick drive. Thereupon the monitor device 56/57 of Fig. 6 generates an excess of signals resulting in a difference signal from comparator 54 of Fig. 6 having a sense such as to restore the piston of the quick drive to the middle of its stroke.

Certain methods of deriving the velocity signal will now be described.

Figure 9:
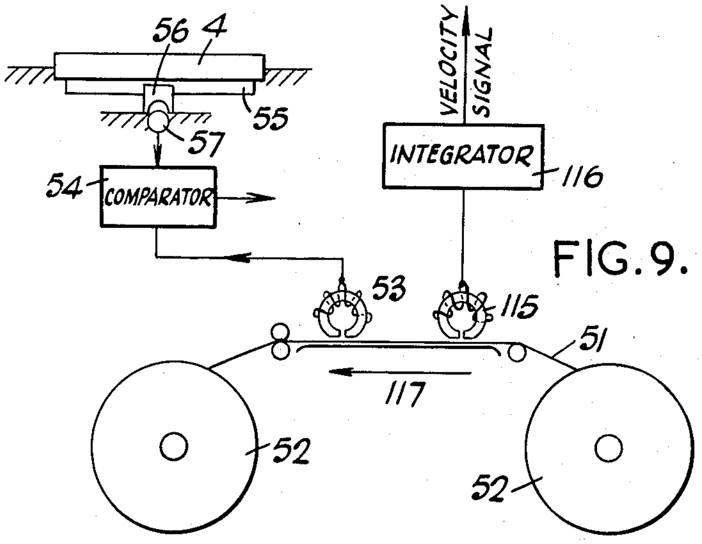
Fig. 9 is a schematic diagram of part of a motor control circuit for use with the said embodiment.

It was indicated, in relation to Fig. 6, that the command signals received from the tape reading head 53 and the table movement monitoring light cell 57 were in digital form and it is proposed to illustrate methods of deriving the velocity signal in relation to such a system. Fig. 9 repeats so much as is necessary of the elements of Fig. 6 and the same reference numerals are used for corresponding items.

The record on tape 51 may take the form of zones of magnetisation which produce an output from reading head 53 in the form of individual electric pulses. Each pulse represents a unit of distance over which work table 4 is to be moved, the size of the unit being of the same order as the limits of accuracy to which the machine is to be controlled, and may be in the range from, say 0.005 to 0.0001 inch in practice. The pulses must indicate the direction in which the movement is to take place and this may be arranged by having pulses of one polarity for forward movement and the other polarity for backward movement. Alternatively two separate tracks may be recorded side by side on the tape and separate side-by-side reading heads used, one for each direction of movement.

Pulses from the tape may be used for deriving the velocity signal either by tapping the output of the reading head 53 (and its duplicate, where two side-by-side reading heads are used) or by means of a separate reading head such as 115 in Fig. 9.

The pulses picked up from tape 51 contain the information of the velocity at which the work table is to move in the form of their recurrence frequency or perhaps, more accurately so far as instantaneous velocity is concerned, in the form of the time interval between two successive pulses. As the velocity signal is not required to follow the short-period fluctuations in the velocity of the work table as expressed in the command signals, however, the pulses may be continuously integrated over a predetermined period of time to give an indication of average velocity. In Fig. 9 the output of reading head 115 is applied to an integrator 116 which produces an output in the form of a potential variable in amplitude and sign according to the required velocity and direction of the work table as expressed in the command signals. Where two reading heads are used with parallel side-by-side tracks on tape 51 for recording the two directions of movement, each reading head may be connected to a separate section of integrator 116, one section giving an output of one polarity and the other of the opposite polarity. The output of the two integrator sections may be interconnected to provide a single input to comparator 101 on lead 102 (Figs. 7 and 8). As the command signals will never call for both directions of movement simultaneously only one integrator section at a time will give an output.

The simplest form of integrator for the purpose is a low-pass filter the time constant of which is chosen to correspond with the period over which the pulses are to be integrated.

In Fig. 9 the reading head 115 is shown as being located in advance of head 53 along the length of tape 51, which moves in the direction of the arrow 117.

Although the input to integrator 116 may, as previously indicated, be taken from reading head 53, it is of advantage in certain circumstances to use a reading head located in advance of 53 for picking up the velocity signal information since this enables a certain degree of anticipation to be obtained. Suppose for instance that the command signals call for an abrupt acceleration of the work table over a distance equal to the full end-to-end stroke of the quick drive. If integrator 116 is fed from reading head 53 the indication of this acceleration will only build up at the output of the integrator after a time lag of the order of its time constant. If the integrator is fed with time-advanced command signals however, it will start to build up an output before the said abrupt acceleration is signalled to the quick drive. The slow drive will then commence to move in advance of the required abrupt acceleration, and the monitoring signals from light cell 57 will cause the quick drive to retreat towards the end of its stroke to counteract this advanced movement of the slow drive. When the abrupt acceleration eventually comes to be signalled to the quick drive, it will have its full stroke available to carry out the required acceleration instead of only half its stroke as would normally be the case if it was resting in its normal mid-stroke position on receipt of the signal to accelerate.

Figure 10:
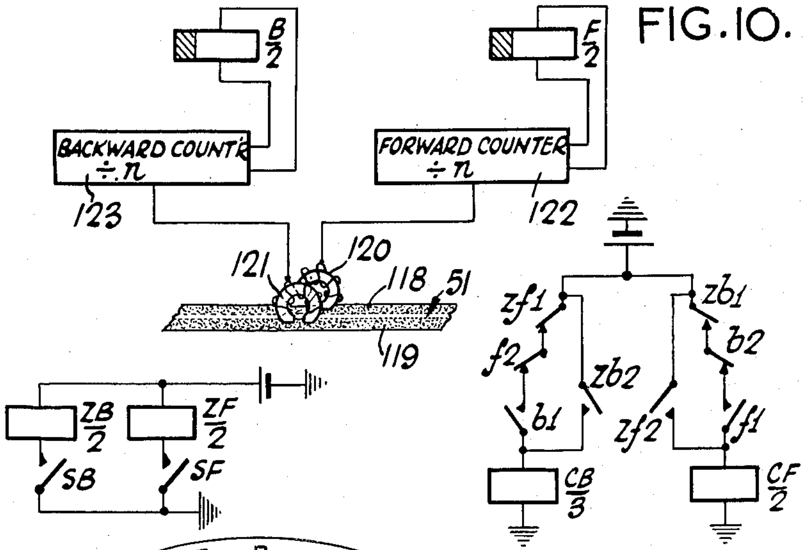
Fig. 10 is a circuit diagram of an alternative motor control circuit for use with the said embodiment.

Another method of controlling motor 9 in accordance with velocity signals derived from a digital command signal record, is illustrated in Fig. 10, which shows the record tape 51 as having two side-by-side tracks 118 and 119 for forward and backward command signal records respectively. Two side-by-side reading heads 120 and 121 are provided for reading these two tracks. The outputs of heads 120 and 121 are taken to two pulse counters 122 and 123 respectively. These pulse counters are of the type which give an output pulse after every *n*th input pulse. The output pulses from each counter will thus recur with a frequency depending upon the repetition frequency of the input pulses received from the corresponding reading head. The output pulses are applied in the case of counter 122 to a relay F, and in the case of counter 123 to a relay B. These relays have a release lag comparable with the shortest interval likely to be encountered between two consecutive counter output pulses, and this in turn must be comparable with the time taken by the motor 9 to reach full speed from rest.

Contacts *f*1 and *b*1 of relays F and B cause the operation of relays CF and CB which have contacts as shown in Fig. 8, for controlling motor 9. The circuits for operating CF and CB are different from those shown in Fig. 8 however.

CB is normally operated on the closing of *b*1 contacts in series with normally closed contacts *f*2 and *zf*1. CF is similarly normally operated on the closing of *f*1 contacts in series with normally closed contacts *b*2 and *zb*1. Contacts *f*2 and *b*2 acts as an insurance against the simultaneous operation of CB and CF (which would short circuit the supply mains), in the event of a sudden reversal of sign of the command signals which might operate B during the release lag of F or vice versa.

In this simplified arrangement no provision is made for monitoring the speed made good by motor 9, reliance being placed on switches such as SF and SB in Fig. 7 to correct any discrepancy between the velocity signal and the actual performance of the slow drive.

Contacts of switches SF and SB are caused respectively to operate relays ZF and ZB. When ZF operates, its normally closed *zf*1 contacts disconnect the normal operating circuit of CB and its *zf*2 contacts operate CF directly. If CF were to be already operated over its normal operating circuit the operation of ZF would not affect matters, but in any event this can hardly arise in practice. When ZB operates, its normally closed *zb*1 contacts disconnect the normal operating circuit of CF and its *zb*2 contacts operate CB directly.

In a more elaborate arrangement using counters such as 122 and 123 a velocity monitor is provided for motor 9 which delivers pulses so long as the motor is rotating, of pulse recurrence frequency proportional to the motor velocity and having one sign for one direction of rotation and the other sign for the other direction of rotation. The pulse recurrence frequency from this monitor must be such that for any given motor speed it is the same as that of the outputs of counter 122 or 123 when the command signals from tape 51 call for that given speed.

The pulses from the counters 122 and 123 are then continuously compared in a double input two-way comparator counter adjusted to give a zero output when the direction and speed of rotation of motor 9 accords with the required average speed indicated by the pulse recurrence frequency of the counter 122 or 123 as the case may be. Any disparity between the speed and direction of the motor 9 and the speed and direction required would act cumulatively in the comparator counter and a continued disparity, however small, would rapidly build up an output sufficient to operate a motor controller. The comparator counter would have two outputs, one for positive totals and the other for negative totals and these two outputs would be applied to the grids of tube-halves 106 and 106′ in a circuit as shown in Fig. 8.

This overcomes a disadvantage of arrangement such as that illustrated in Fig. 7 at slow speeds when the velocity signal and the tachometer generator signal may differ continuously by an amount too small to operate the comparator 101. In such conditions the overriding action of switches SF and SB is continually being invoked which may cause hunting.

In the embodiments of the invention described above a rotary motor driving a rotary-to-linear converter has been used for the slow drive and a hydraulic piston and cylinder combination has been used for the quick drive. This arrangement is to be preferred for the normal type of machine tool application of the invention.

Another type of application however may call for a considerably greater sensitivity over a very much shorter range of travel. To meet such a requirement the slow drive may take the form of a hydraulic cylinder and piston arrangement such as is used for the quick drive in the previously described embodiments, whilst the quick drive may take the form of an electro-mechanical transducer having an extremely short range of driving action but extremely rapid response to changes in the command signal. A magneto-strictive transducer could be employed in this role since transducers of this type are capable of developing an extremely powerful thrust. With an arrangement of this type it is not essential to provide signals of a different type to the slow drive and the quick drive and they may both receive the same command signals. The slow drive acts as an integratory such as 116 of Fig. 9 and will fail to respond to variations in the command signal which are outside its range of sensitivity, and these variations will be dealt with by the quick drive. An arrangement of this type is suitable for use in a case where the object to be moved is subjected to vibration which causes small to and fro motions to be registered by position monitoring means such as the diffraction grating system 55, 56, 57 described in relation to Fig. 6. These movements, even in the presence of a command signal demanding a smooth movement in one direction, will result in a rapid fluctuation in the net command signal emerging from comparator 54. The amplitude of such vibrations will be predictable however and it can be arranged that they do not exceed the stroke of a magneto-strictive transducer or the like acting as the quick drive. The stroke of the quick drive will not be exhausted in these circumstances, whilst the slow drive will in fact be sufficiently sensitive to deal with the accelerations called for by the programme of motion required to be executed by the moved object, and will not allow the stroke of the quick drive to be exhausted in the course of executing such movements.

It will be apparent that a combination of a quick drive and a slow drive of the type referred to in the immediately preceding passages, may be part of a triple-unit drive in which a slow drive and quick drive combination such as that illustrated in Figs. 1, 2, 3 and 4 is supplemented by a yet quicker drive such as a magneto-strictive transducer, all three drives being coupled together and to the two objects between which relative motion is desired so that such relative motion is the algebraic sum of the individual motions of the three drives. The two quicker drives may be energised directly from the same net command signal and the slow drive by any of the methods previously described. Alternatively each of the three drives may be energised by an individual signal specially suited to its capabilities and adapted to ensure that each drive prevents the next quicker drive from exceeding its range of driving action.

A further method of providing a quick drive with a particularly short range of movement may be adopted when the slow drive is in the form of a lead screw and nut. This method comprises rotation through a limited angle of the lead screw or the nut, according to which is the passive member of the combination. Mechanisms for securing this rotation are well known since it is a common method of compensating for errors in the pitch of a lead screw by means of a so-called "corrector bar," which is a profiled edge along which a follower member rides in the course of the motion produced by the nut-and-lead screw combination and the profile is shaped to rotate the passive member of the said combination through the agency of the follower member, through small angles so as to modify the motion which would otherwise take place under the action of the said combination.

In using such an arrangement for providing a quick drive according to the invention, the follower member or its equivalent would be controlled not by a corrector bar but by an actuator to which the net command signals were applied and in such an arrangement the same net command signals would also preferably be applied to the slow drive directly.

In all embodiments of the invention it is preferable that the complete chain of linkages from one to the other of the two objects between which relative movement is required, should be free from backlash and elasticity since any lost motion due to these factors constitutes an absolute limit to the accuracy with which the driving mechanisms can control the relative movements between the two objects. It is nevertheless permissible to have a certain amount of backlash and elasticity present in such linkages (indeed it is scarcely possible to eliminate them entirely in practice), so long as the total) lost motion remains substantially below the limits of accuracy with which the relative motion between the two objects is to be controlled.

The slow drive should preferably be irreversible in the sense that it cannot yield under loads imposed upon it by the driving action of the quick drive. A certain amount of reversibility is permissible however so long as such reversibility operates at an extremely low mechanical advantage.

Figure 11:
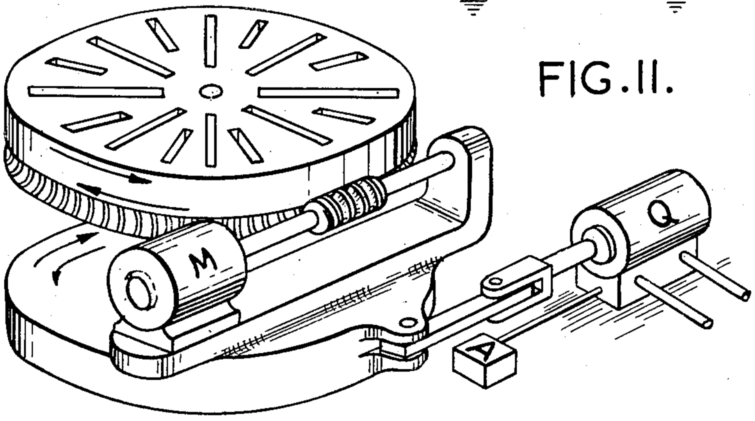
Fig. 11 is a schematic diagram of a rotary version of the invention.

As previously indicated, the path along which the objects move relative to one another is not necessarily a straight line path. For instance Fig. 11 illustrates in a schematic way an arrangement where this relative movement is rotational. In Fig. 11 a work table journalled for rotation in bearings (not shown) is driven by a slow drive in the form of a worm wheel coupled to the work table (shown as machined from the under side of the rim of the work table). This worm wheel co-operates with a worm driven by the motor M of the slow drive which are mounted on a subtable which is also journalled for rotation coaxial with the work table in bearings (not shown). The quick drive Q is anchored to fixed parts of the machine and can rotate the subtable carrying motor M to and fro over a limited angle by means of a connecting rod.

We claim:

1. Apparatus for driving a first object along a predetermined path in relation to a second object comprising two driving mechanisms coupled together and to the first object and the second object in such a manner that movements of the first object relative to the second object along the said path are dependent upon the algebraic sum of the individual driving actions of the two driving mechanisms, the first driving mechanism being capable of a relatively high driving acceleration over only a relatively short range of driving action and the second driving mechanism being capable of a relatively long range of driving action but being arranged to provide only a relatively low driving acceleration, means, responsive to a first signal representing the motion required of the first object in relation to the second object along the said path, for actuating the first driving mechanism, means for producing a second signal, means for applying the second signal to control the driving action of the second driving mechanism, the second signal representing the average velocity, over a continuously advancing time period of predetermined duration, of the motion required of the first object relative to the second object along the said predetermined path, and being related to the first signal in such a manner as to prevent the first driving mechanism from reaching the end of its range of driving action.

2. Apparatus for driving a first object along a predetermined path in relation to a second object comprising two driving mechanisms coupled together and to the first object and the second object in such a manner that movements of the first object relative to the second object along the said path are dependent upon the algebraic sum of the individual driving actions of the two driving mechanisms, the first driving mechanism being capable of a relatively high driving acceleration over only a relatively short range of driving action and the second driving mechanism being capable of a relatively long range of driving action but being arranged to provide only a relatively low driving acceleration, means for receiving signals representing required relative movements between the two objects along the said path, means under control of the receiving means, for actuating the first driving mechanism in direct accordance with the said signals and means under control of the receiving means for driving the second driving mechanism at a velocity, which at any instant, is the algebraic mean, over a predetermined period of time including that instant, of the velocities required of the said objects relative to one another, as represented by the said signals.

3. Apparatus for driving a first object in relation to a second object along a predetermined path, having a first driving mechanism and a second driving mechanism, these two driving mechanisms being coupled together and to the first object and the second object in such a manner that movements of the first object relative to the second object along the said path are dependent upon the algebraic sum of the individual driving actions of the two driving mechanisms the first driving mechanism being capable of a relatively high driving acceleration over only a relatively short range of driving action and the second driving mechanism being capable of a relatively long range of driving action but being arranged to provide only a relatively low driving acceleration, a closed servo loop for controlling the relative motion between the two objects in the direction of the said path such loop comprising means for receiving command signals characteristic of desired relative motion between the said objects along the said path, means for receiving monitor signals characteristic of relative motions actually taking place between the said objects along the said path, means for continuously comparing the command signals and the monitor signals and continuously generating an error signal representing the instantaneous difference between the command signals and the monitor signals, means for continuously actuating the first driving mechanism in accordance with the instantaneous value of the error signal and means for actuating the second driving mechanism so that it executes a driving action tending to produce, between the said objects, relative movements at the average, over a continuously advancing period of time of predetermined length, of the velocity of the said desired relative motion between the said objects.

4. Apparatus as claimed in claim 3 in which the means for actuating the second driving mechanism comprises an integrator circuit adapted to receive the command signals and to derive therefrom a velocity signal representing the average velocity, over a continuously advancing period of time of predetermined duration of the desired relative motion between the said objects represented by the command signals.

5. Apparatus as claimed in claim 3 in which the means for actuating the second driving mechanism is adapted to receive the error signal, the response characteristics of the second driving mechanism and its actuating means together being such that the second driving mechanism is not responsive to fluctuations in the value of the error signal exceeding a predetermined frequency.

6. Apparatus for driving a first object in relation to a second object along a predetermined path, having a first driving mechanism comprising a hydraulic piston and cylinder arrangement and a second driving mechanism comprising a rotary driving motor coupled to a device for transforming rotary motion derived from the said motor, into motion in the direction of the said path, the two driving mechanisms being coupled together and to the first object and the second object so that relative movement between the two objects along the said path is dependent upon the alegbraic sum of the driving actions of the two driving mechanisms, the hydraulic piston and cylinder arrangement having a short stroke and being controlled by a high performance hydraulic valve, the second driving mechanism having a range of driving action which is long in relation to the said stroke but being arranged to provide a driving acceleration which is low in relation to that of the hydraulic piston and cylinder arrangement, a closed servo loop for controlling the relative motion between the two objects in the direction of the said path comprising means for receiving signals characteristic of desired relative motion between the said objects along the said path, means for receiving monitor signals characteristic of relative motions actually taking place between the said objects along the said path, means for comparing the said signals so received and continuously generating an error signal representing the difference between the said signals, an actuator for the hydraulic valve, means for continuously operating the actuator in accordance with the instantaneous value of the error signal, second means for receiving the command signals, means under control of the second command signal receiving means for deriving a velocity signal representing an average of the relative velocity between the said objects represented by the command signals, first means for energising the motor of the second driving mechanism under control of the velocity signals, co-operating members coupled respectively to the piston and cylinder of the said hydraulic arrangement engaging when the piston reaches a predetermined position between the middle and end of its stroke, second motor energising means operative when the said members engage as aforesaid, for releasing the motor of the second driving mechanism from control by the velocity signal and for energising the said motor in a sense such as to supplement the driving action of the hydraulic arrangement and operative after the members have moved out of engagement for de-energising the motor and restoring it to control by the velocity signals.

7. Apparatus as claimed in claim 6 comprising means for deriving from the motor of the second driving mechanism a velocity monitor signal indicative of the rotational direction and velocity of that motor and in which the first motor energising means comprises means for continuously comparing the velocity signal and the velocity monitor signal and generating a velocity error signal and means under control of the velocity error signal for energising the said motor.

No references cited.